Figures 1, 2:
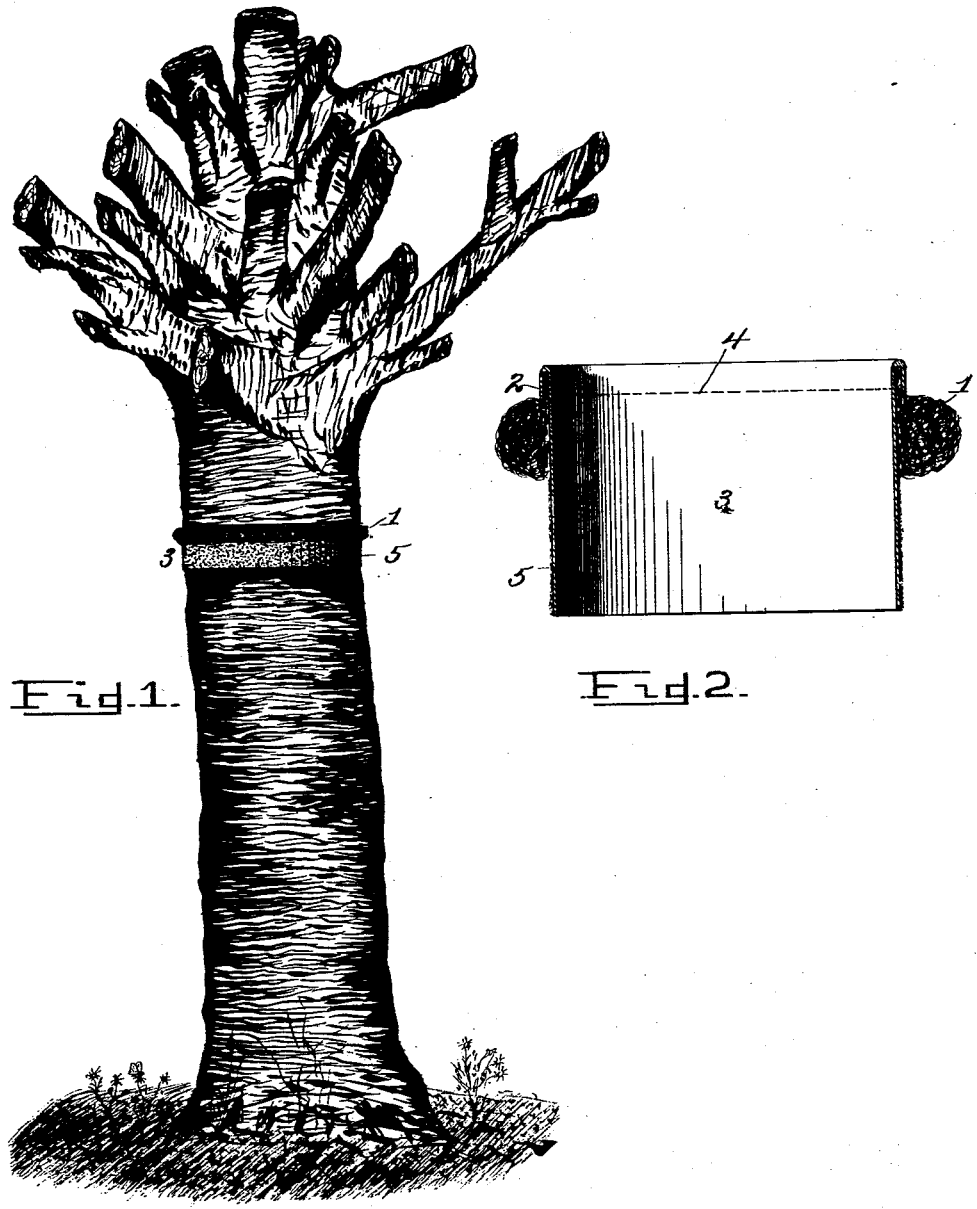

(No Model.)

H. H. BELKNAP.
TREE PROTECTOR.

No. 569,084.   Patented Oct. 6, 1896.

Witnesses:—
Harry Holgate.
S. J. Williamson

Inventor:—
Harry H. Belknap
by Geo. H. Holgate
Attorney.

THE NORRIS PETERS CO., PHOTO-LITHO., WASHINGTON, D. C.

UNITED STATES PATENT OFFICE.

HARRY H. BELKNAP, OF PHILADELPHIA, PENNSYLVANIA.

TREE-PROTECTOR.

SPECIFICATION forming part of Letters Patent No. 569,084, dated October 6, 1896.

Application filed October 26, 1895. Serial No. 567,004. (No model.)

*To all whom it may concern:*

Be it known that I, HARRY H. BELKNAP, a citizen of the United States, residing at Philadelphia, in the county of Philadelphia and State of Pennsylvania, have invented certain new and useful Improvements in Tree-Protectors, of which the following is a full, clear, and exact specification.

My invention relates to a new and useful improvement in tree-protectors; and its object is to prevent insects, especially caterpillars, from passing up the trunk of the tree to the branches and leaves thereof; and with this end in view the invention consists in the details of construction and combination of elements hereinafter set forth and then specifically designated by the claims.

In order that those skilled in the art to which my invention appertains may understand how to make and use the same, I will describe its construction and operation in detail, referring by number to the accompanying drawings, forming a part of this specification, and in which—

Figure 1 represents a tree having my improvement attached thereto; and Fig. 2 is a central section of the device, illustrating the mode of constructing the same.

Similar numbers denote like parts in both views of the drawings.

In manufacturing my improved tree-protector I take a strip of cotton-batting 1 of the desired length and place it beneath the folded edge 2 and the body 3 of a strip of paper of equal length and secure it thereto by the stitchings 4. This will compress the cotton-batting between the folded edge and body of the paper strip, as clearly shown in Fig. 2, but permit it to assume a semicircular shape below the edge of the fold 2, for the purpose hereinafter set forth.

The outer surface of the strip 3, below the batting, is covered with a sticky material, preferably of a poisonous nature, so that when the protector is secured in place upon the tree-trunk by small nails or tacks insects attempting to pass up the tree first come in contact with this sticky substance and are thereby prevented from further ascent and are tempted to eat of the sticky substance, which, being poisonous, will cause the insects to die and drop from the tree; but should any insect be vigorous enough to force its way across the sticky material it will then come in contact with the cotton-batting and any attempt to pass over this batting will embed the insect therein by its becoming entangled with the fibers of the batting on account of the sticky material which has accumulated upon it from the surface over which it has just passed; so that it will be seen that under no circumstances can any insect pass from the ground to the branches and leaves of a tree when said tree is protected by my improvement.

In practice the paper and batting may be stitched together in any lengths and afterward cut to the desired length to encircle the tree to which it is to be applied. By this method the cost of manufacture would be greatly reduced.

A compound suitable to use on this device is one composed of castor-oil and rosin combined in such proportions as to make an extremely sticky mass, to which is added a small quantity of corrosive sublimate.

Having thus fully described my invention, what I claim as new and useful is—

1. A tree-protector, consisting of a strip of paper folded at its upper edge and having secured thereto, beneath said fold, a strip of cotton-batting, by stitching, as shown and described.

2. As a new article of manufacture, a tree-protector, consisting of a strip of paper having its upper edge turned over, a strip of cotton-batting having its upper edge secured beneath said folded strip by a line of stitching 4, and a sticky material applied to the outer surface of the paper strip below said cotton-batting, as specified.

3. In a tree-protector, a strip of paper 3, having its upper edge 2, folded over, a strip of batting having its upper edge secured beneath this folded edge by a line of stitching, a sticky material 5, applied to and covering the outer surface of the strip 3, below the cotton-batting, as shown and for the purpose set forth.

In testimony whereof I have hereunto affixed my signature in the presence of two subscribing witnesses.

HARRY H. BELKNAP.

Witnesses:
S. S. WILLIAMSON,
SAMUEL L. TAYLOR.